US011084746B2

(12) United States Patent
Roberts (10) Patent No.: US 11,084,746 B2
(45) Date of Patent: Aug. 10, 2021

(54) SYSTEMS FOR REMOVING SLUDGE FROM OR DISTRIBUTING FLUIDS IN SLUDGE OR WASTE COLLECTION VESSELS

(71) Applicant: ROBERTS MARKETING DE, INC., Wilmington, DE (US)

(72) Inventor: R. Lee Roberts, Rose Valley, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 43 days.

(21) Appl. No.: 15/604,055

(22) Filed: May 24, 2017

(65) Prior Publication Data

US 2018/0340325 A1 Nov. 29, 2018

(51) Int. Cl.
*C02F 3/20* (2006.01)
*F16L 3/12* (2006.01)
*B01F 3/04* (2006.01)
*F16L 3/223* (2006.01)

(52) U.S. Cl.
CPC ............ *C02F 3/20* (2013.01); *B01F 3/04241* (2013.01); *F16L 3/1218* (2013.01); *F16L 3/223* (2013.01)

(58) Field of Classification Search
CPC .. B01D 2201/087; B01F 3/04241; C02F 3/20; F16L 3/1218; F16L 3/223
See application file for complete search history.

(56) References Cited

U.S. PATENT DOCUMENTS

| 1,773,417 | A | * | 8/1930 | Whitacre | C02F 3/10 210/293 |
| 3,397,431 | A | * | 8/1968 | Walker | F16L 3/2235 403/344 |
| 3,733,064 | A | * | 5/1973 | Branton | B01F 3/0412 261/122.1 |
| 3,847,331 | A | * | 11/1974 | Vallinotto | F16L 3/12 248/74.3 |
| 5,911,241 | A | | 6/1999 | Roberts | |
| 6,045,709 | A | | 4/2000 | Roberts | |
| 6,354,328 | B1 | | 3/2002 | Roberts | |
| 8,998,001 | B2 | | 4/2015 | Roberts | |
| 9,067,727 | B2 | | 6/2015 | Roberts et al. | |
| 2008/0224337 | A1 | * | 9/2008 | Tharp | B01F 3/04113 261/120 |
| 2011/0073549 | A1 | * | 3/2011 | Geibel | B01D 24/24 210/793 |

(Continued)

*Primary Examiner* — Liam Royce
(74) *Attorney, Agent, or Firm* — Merek, Blackmon & Voorhees, LLC (57) ABSTRACT

Systems for use in one or more sludge or waste collection devices (e.g., containers, vessels or basins). One such system is a sludge removal system for removing sludge from one or more sludge collection devices. The sludge removal system includes one or more sludge removal grids disposed in one or more sludge collection devices. Each sludge removal grid preferably includes at least one header and a plurality of sludge collection laterals. Another such system includes a fluid distribution system for distributing one or more fluids in one or more sludge or waste collection devices. A movement restricting or prevention member is provided in both the fluid distribution and sludge removal systems to prevent or restrict movement of the sludge collection laterals and the fluid distribution laterals away from or towards a floor of a corresponding collection device without anchoring or fixing the laterals to the floor.

13 Claims, 8 Drawing Sheets

(56) References Cited

U.S. PATENT DOCUMENTS

2012/0037574 A1* 2/2012 Gardiner ................ C02F 3/201
                                                    210/803
2012/0111777 A1   5/2012 Roberts et al.
2015/0190737 A1* 7/2015 Geibel .................. B01D 24/24
                                                    210/293

* cited by examiner

FIGURE 1

PRIOR ART

SYSTEMS FOR REMOVING SLUDGE FROM OR DISTRIBUTING FLUIDS IN SLUDGE OR WASTE COLLECTION VESSELS

FIELD OF THE INVENTION

Preferred forms of the present invention are directed to systems for use in one or more sludge or waste collection containers or vessels. More specifically, one preferred form of the present invention is directed to a sludge removal system for removing sludge from one or more sludge collection containers, compartments, basins or vessels. Another preferred form of the present invention is directed to a fluid distribution system for distributing one or more fluids in one or more sludge or waste collection containers, compartments, basins or vessels.

BACKGROUND OF THE INVENTION

Various systems have been used in connection with sludge or waste collection containers, basins, compartments or vessels. One well known and effective sludge removal system used in connection with sludge or waste collection containers, basins, compartments or vessels is the SPYDER® sludge collection system one layout of which is depicted in FIG. 1.

Figure 1:
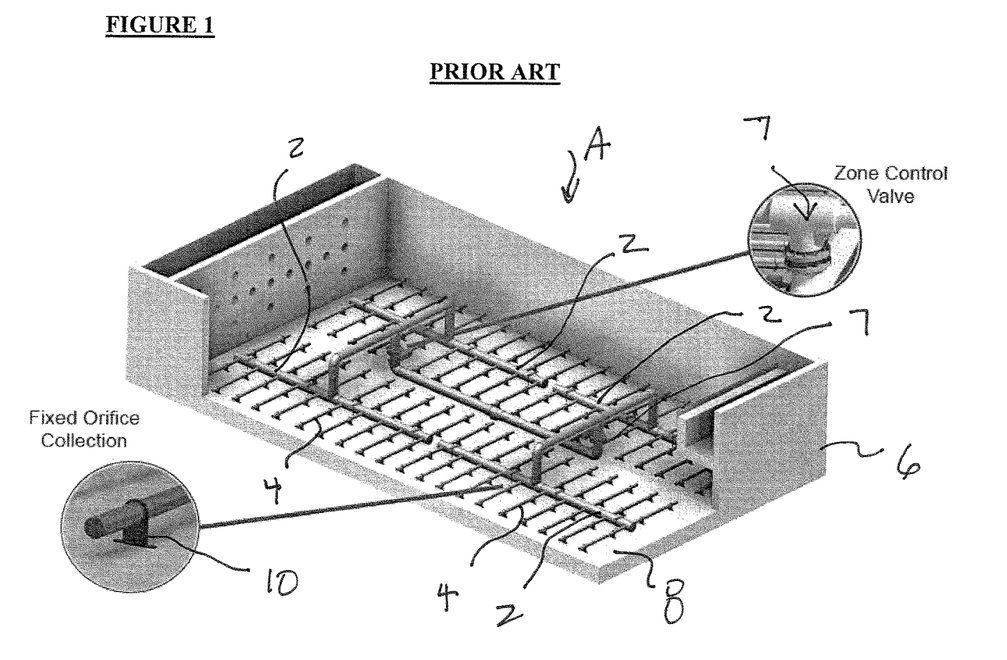
FIG. 1 is a fragmentary perspective view of a prior art sludge removal system.

The sludge removal system A depicted in FIG. 1 includes four sludge removal grids wherein each sludge removal grid includes a header 2 and a plurality of laterals 4 connected to and extending outwardly from opposite sides of the corresponding header. The sludge removal system A includes a plurality of valves (e.g., zone control valves 7 that allow an operator to selectively remove sludge from one or more zones).

Where one or more valves are opened or closed quickly, the collection laterals can move toward or away from the floor 8 of the collection basin 6. The movement can be so vigorous that one or more sludge collection laterals break or are otherwise damaged preventing the sludge collection lateral from functioning in its intended manner. To prevent this obviously undesirable occurrence, the SPYDER® sludge collection system includes a plurality of anchors 10 for fixing/anchoring each of the sludge collection laterals 4 to floor 8 of the collection basin 6.

Anchors 10 are anchored or fixed to floor 8 by drilling a suitable size slot, hole or opening so that the lower portion of anchor 10 can extend into the slot, hole or opening. An epoxy is applied to the lower portion of the anchor 10 to anchor or fix this member to floor 8. As is readily evident from the arrangement depicted in FIG. 1, a number of slots, holes or openings must be drilled to secure the necessary number of anchors 10 to floor 8. This is a time consuming process which ultimately adds to the cost of the system.

OBJECTS AND SUMMARY OF THE INVENTION

An object of a preferred form of the present invention is to provide a sludge removal system which includes a plurality of sludge collection laterals that are prevented from being damaged by movement of the sludge collection laterals away from or towards the floor of a sludge collection device without anchoring the sludge collection laterals to the floor of the sludge collection device.

Another object of a preferred form of the present invention is to provide a fluid distribution system which includes a plurality of fluid distribution laterals that are prevented from being damaged by movement of the fluid distribution laterals away from or towards the floor of a sludge or waste collection device without anchoring the fluid distribution laterals to the floor of the sludge or waste collection device.

A further object of a preferred form of the present invention is to provide lateral movement restriction members that restrict or prevent movement of one or more laterals away from or toward a floor of a sludge or waste collection device without anchoring or fixing any portion of the lateral movement restriction members to the floor of the sludge or waste collection device.

Still another object of a preferred embodiment of the present invention is to provide lateral movement restriction members configured such that a lowermost surface of each of the lateral movement restriction members rests on the floor of the sludge or waste collection device to prevent the corresponding lateral or laterals from moving toward the floor without attaching, fixing or anchoring the lateral movement restriction members to the floor.

Still a further object of a preferred embodiment of the present invention is to provide lateral movement restriction members configured to use fluid pressure present in the sludge or waste collection device to prevent one or more laterals from moving away from the floor of sludge or waste collection device.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention. Further, the above is not an exhaustive list of the advantages and objects of the preferred forms of the present invention. Other advantages and objects of preferred forms of the present invention will be readily appreciated from the description of the preferred forms of the present invention.

In summary, one preferred embodiment of the present invention is directed to a sludge collection system for removing sludge from a sludge collection container. The sludge collection system includes at least one fixed sludge removal grid for removing sludge from at least a portion of the sludge collection container. The at least one fixed sludge removal grid includes a header and a plurality of collection laterals connected to the header such that during sludge removal sludge passes from the plurality of collection laterals to the header. At least one movement restricting member is operably associated with the plurality of collection laterals for restricting vertical movement of the plurality of collection laterals wherein a lowermost portion of the at least one movement restricting member rests on but does not penetrate a floor of the sludge collection container.

Another preferred embodiment of the present invention is directed to a sludge collection system for removing sludge from a sludge collection container. The sludge collection system includes at least one sludge removal zone for removing sludge from at least a portion of the sludge collection container. The at least one sludge removal zone includes a sludge collection container and a fixed sludge removal grid disposed in the sludge collection container. The fixed sludge removal grid includes a header and a plurality of floating collection laterals connected to the header such that during removal of sludge from the sludge collection container sludge passes from the plurality of floating collection laterals to the header. At least one movement restricting member is connected to the plurality of floating collection laterals for restricting movement of the plurality of floating collection laterals away from and towards a floor of the sludge collection container. The at least one movement restricting member is spaced from the header.

A further embodiment of the present invention is directed to a sludge collection system for removing sludge from a sludge collection container. The sludge collection system includes a sludge collection container and at least one sludge removal grid disposed in the sludge collection container for removing sludge from at least a portion of the sludge collection container. The at least one sludge removal grid includes a header and a plurality of collection laterals connected to the header such that during sludge removal sludge passes from the plurality of collection laterals to the header. At least one movement prevention member is connected to the plurality of collection laterals for preventing movement of the plurality of collection laterals towards or away from a floor of the sludge collection container, wherein a lowermost portion of the at least one movement restricting member rests on but does not penetrate the floor of the sludge collection container to prevent a corresponding collection lateral from moving toward the floor of the sludge collection container. The at least one movement prevention member has an exposed surface area of sufficient size such that fluid pressure acting on the exposed surface area prevents a corresponding collection lateral from moving upwardly away from the floor of the sludge collection container.

Still another embodiment of the present invention is directed to a fluid distribution system for distributing one or more fluids in a waste collection vessel. The fluid distribution system includes a waste collection vessel for containing waste and at least one fluid distribution grid disposed in the waste collection vessel for distributing one or more fluids in at least a portion of the waste collection vessel. The at least one fluid distribution grid includes a header and a plurality of distribution laterals connected to the header such that during fluid distribution fluid passes from the header to the plurality of distribution laterals and into the waste collection vessel. At least one movement prevention member is connected to the plurality of distribution laterals for preventing movement of the plurality of distribution laterals towards or away from a floor of the waste collection vessel, wherein a lowermost portion of the at least one movement restricting member rests on but does not penetrate the floor of the waste collection vessel to prevent a corresponding distribution lateral from moving toward the floor of the waste collection vessel. The at least one movement prevention member has an exposed surface area of sufficient size such that fluid pressure acting on the exposed surface area prevents a corresponding distribution lateral from moving upwardly away from the floor of the waste collection vessel.

The above summary describes preferred forms of the present invention and is not in any way to be construed as limiting the claimed invention to the preferred forms.

DETAILED DESCRIPTION OF THE PREFERRED EMBODIMENTS OF THE INVENTION

The preferred forms of the invention will now be described with reference to FIGS. 2-16. The appended claims are not limited to the preferred forms and no term and/or phrase used herein is to be given a meaning other than its ordinary meaning unless it is expressly stated otherwise.

"Floating collection lateral" as used herein is a collection lateral that is not fixed or anchored to the collection basin or container by one or more attachment, fastening or other anchoring devices that have a portion which is embedded in the collection basin or collection container or that penetrates a surface of the collection basin or collection container. For example, the prior art collection laterals depicted in FIG. 1 are not floating collection laterals as these laterals are anchored to the floor of a sludge collection container by anchors having a portion thereof penetrating the floor of the sludge collection container. It should be noted that components (e.g., sludge removal header, sludge drain/discharge conduit, etc.) other than the floating collection lateral may be fixed or anchored to the collection basin or container by one or more attachment, fastening or other anchoring devices that have a portion embedded in the collection basin or collection container or that penetrates a surface of the collection basin or collection container.

"Fixed sludge removal grid" as used herein is a sludge removal grid that stays in a first position in the collection basin or collection container at all times during sludge removal, i.e., a fixed sludge removal grid does not move across the floor of the collection basin or collection container to remove sludge in its path.

FIGS. 2 Through 16

Referring to FIGS. 2 to 5, a grid B employing a preferred form of the invention is illustrated in one of many possible configurations. Referring to FIGS. 6 to 9, a grid C employing a preferred form of the invention is illustrated in one of many possible configurations. Referring to FIGS. 10 to 13, a grid D employing a preferred form of the invention is illustrated in one of many possible configurations. Referring to FIG. 14, one form of grid C is depicted in an operating position in a containment device or vessel E.

Grids B, C and D can be used, for among other things, as sludge removal grids to remove sludge from a storage device storing waste or sludge. When used as sludge removal grids, grids B, C and D can be fixed sludge removal grids that stay in a first position in the collection basin or collection container at all times during sludge removal, i.e., the sludge removal grids when of the fixed type do not move across the floor of the collection basin or collection container to remove sludge in their path.

Grids B, C and D may also be used as fluid distribution grids for distributing one or more fluids (e.g., air or other fluid suitable for treating or otherwise processing sludge or waste) in a storage device storing waste or sludge.

Figure 15:
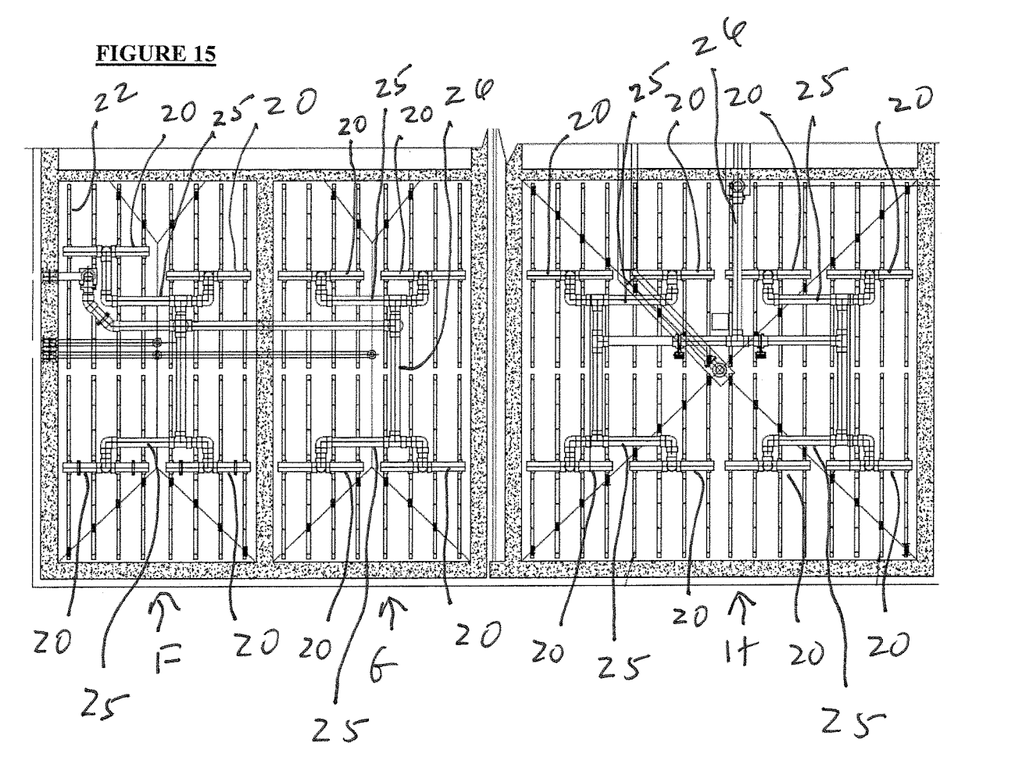
FIG. 15 is a plan view of one of many different layouts for a sludge removal system formed in accordance with preferred forms of the present invention.

FIG. 15 illustrates one of many different possible configurations for sludge removal systems formed in accordance with the present invention. The sludge removal system depicted in FIG. 15 employs three collection/storage devices, basins, containers or vessels F, G and H. However, it will be readily appreciated that the number of storage/collection devices may be readily varied as desired. Any of grids B, C and D can be used in the configuration depicted in FIG. 15 in any possible grid combination. For example, the four grids depicted in basin F can be grids B, the four grids depicted in basin G could be grids C and the eight grids depicted in basin H can be grids D. Further, each basin could include any combination of two or more of grids B, C and D Alternatively, the grids in basins F, G and H can be of the same type, e.g., all grids B. While four and eight grid basins are shown, it will be readily appreciated that the number of grids in any storage or collection device can be readily varied as desired.

Figure 16:
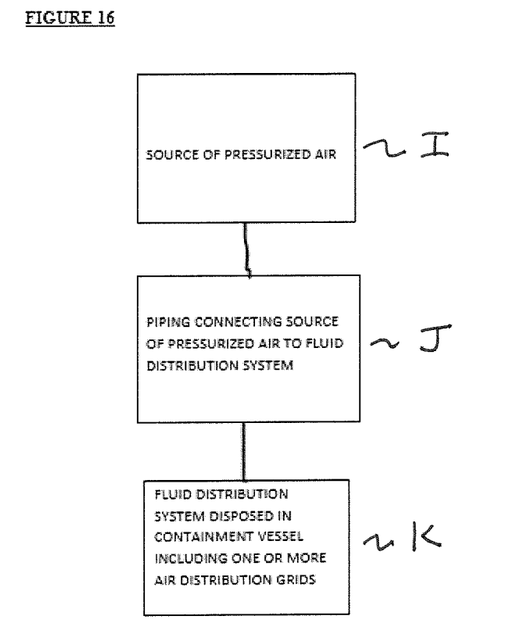
FIG. 16 is a schematic diagram of one air distribution system formed in accordance with one preferred form of the present invention.

FIG. 16 illustrates schematically a fluid distribution system K connected to a fluid source I by piping members (e.g., one or more drop pipes) J. The fluid distribution system K may include one or more of any of grids B, C and D and/or any combination of grids B, C and/or D. The fluid distribution system can be employed in storage or collection devices similar to those discussed in connection with FIG. 15. Typically, the connecting piping J will include a vertically extending drop pipe connected to one or more headers of grids B, C and D to supply one or more fluids to the corresponding header or headers which in turn supplies the one or more fluids to the corresponding laterals from which the fluid escapes and enters the storage or collection device or devices.

Referring again to FIGS. 2 to 5, grid B includes a header 20, a plurality of laterals 22 extending from opposite sides of header 20 and piping connector 24 for connecting grid B to one or more additional piping members. While the preferred form depicted in FIGS. 2 to 5 has laterals extending from opposing sides of header 20, it will be readily appreciated that one or more laterals may extend from only one side of header 20. The configuration and relationship of header 20 and laterals 22 as well as the number and type of zones may be varied as described in U.S. Pat. No. 5,911,241.

Each of the laterals 22 are in communication with header 20 such that depending upon the environment in which grid B is deployed fluid and/or material passes from the laterals 22 into header 20 or fluid and/or material passes from header 20 into laterals 22. Header 20 preferably has two sealed ends. The laterals 22 preferably include a plurality of openings (not shown) for receiving or discharging fluid and/or material. The number, size and spacing of the openings may be varied as desired including but not limited to as described in U.S. Pat. No. 5,911,241. For example, the openings could be uniformly or non-uniformly spaced along laterals 22.

When grid B is used in a sludge collection system, material, liquid and/or fluid enters laterals 22 and subsequently passes into header 20. As illustrated in FIG. 15, connecting piping 25 receives material, liquid and/or fluid from two headers 20 and subsequently passes the material, liquid and/or fluid, into discharge conduit 26 from which the material, liquid or fluid is subsequently discharged from the collection basin, vessel or container.

When grid B is used in a fluid distribution system, liquid and/or gas enters header 20 and passes into laterals 22 and is subsequently released into the corresponding container, device or vessel. Piping connector 24 may be connected directly or indirectly to a drop pipe supplying a pressurized fluid (e.g., air) from a fluid source I (e.g., a source of pressurized air).

Figure 2:
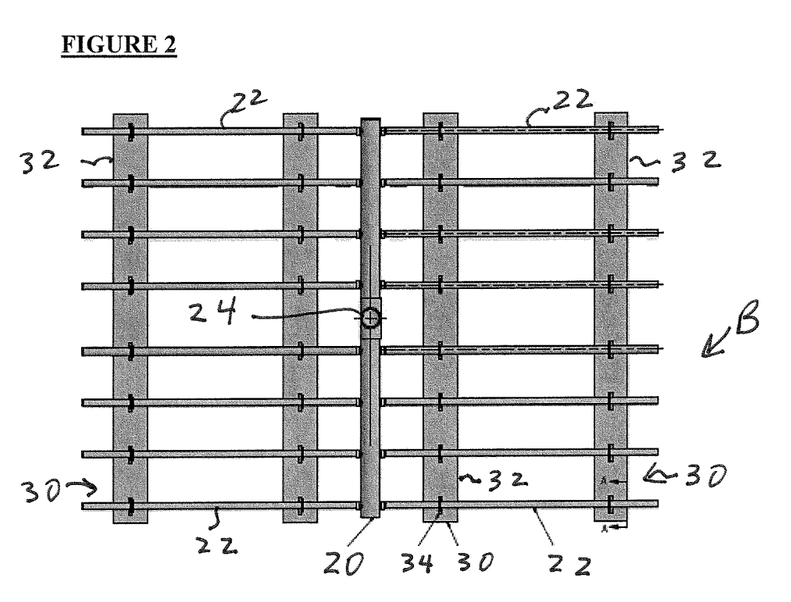
FIG. 2 is a plan view of one preferred form of grid for use as either a sludge removal grid or a fluid distribution grid.
Figure 3:
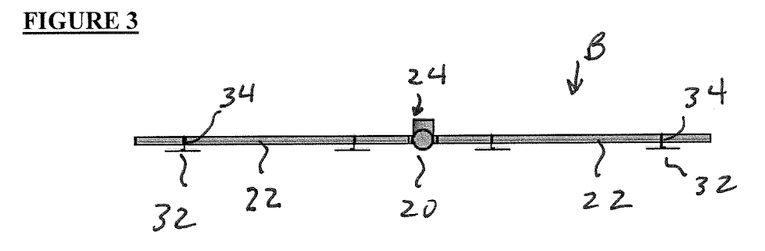
FIG. 3 is a front elevational view of the grid depicted in FIG. 2.
Figure 4:
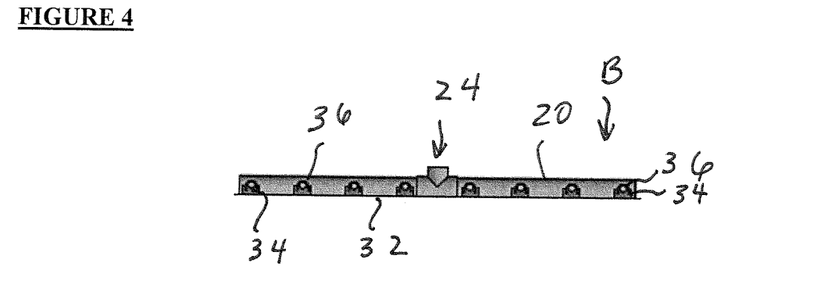
FIG. 4 is a side elevational view of the grid depicted in FIG. 2.

Grid B preferably includes a plurality of movement restricting/prevention members 30. Preferably, movement restricting/prevention members 30 are each connected to a plurality of laterals 22. As seen in FIG. 2, two movement restricting/prevention members 30 are connected to each lateral 22 in each set of eight laterals 22 extending from opposite sides of header 20. It should be noted that the number of laterals in any given set of laterals and the number of movement restricting/prevention members 30 connected to each set of laterals may be readily varied as desired.

Preferably, movement restricting/prevention members 30 include a horizontally or substantially horizontally extending member 32 and a plurality of vertically or substantially vertically extending members 34 attached along member 32 directly below each lateral 22 in a set of laterals. Members 34 are connected at a midpoint of the width of member 32 and extend perpendicular to laterals 22.

Figure 5:
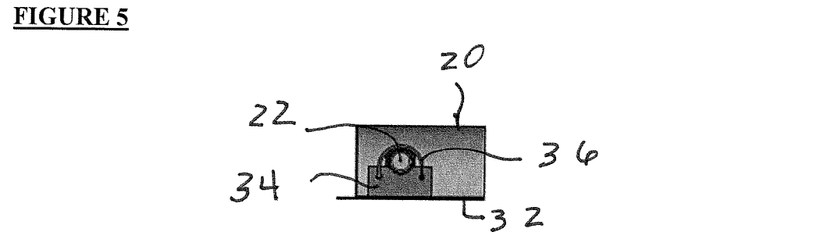
FIG. 5 is an enlarged view of the portion of the grid of FIG. 2 designated by lines A-A in FIG. 2.

Referring to FIG. 5, each member 34 includes a recess which conforms to the contour of a lower portion of the outer periphery of the corresponding lateral so that a corresponding portion of the lateral rests in the recess of member 34 and directly contacts member 34. Connectors 36 extend around an upper portion of the outer periphery of laterals 22 and are attached at opposite ends to each of the plurality of members 34 to support members 34 and member 32 on the corresponding lateral. It should be noted that connector 36 is preferably fixed to a portion of the corresponding lateral so that movement restricting/prevention members 30 do not move relative to the laterals.

Each component of the movement restricting/prevention members 30 can be made of plastic (e.g., PVC) or any other suitable material. Preferably, member 32 is made of a flimsy material (e.g., ⅛ inch plastic). Preferably, movement restricting/prevention members 30 are configured such that the lowermost surface (e.g., lower surface of member 32) rests on a floor of the corresponding storage or collection device without any portion of the movement restricting/prevention members 30 being fixed, attached or anchored to the floor. Because the lower most surface of members 30 are in direct contact with the floor of the corresponding storage or collection device, no portion of laterals 22 can move toward the floor. Members 32 have an exposed upper surface area of sufficient size such that the existing fluid pressure acting on the exposed upper surface area in the corresponding storage or collection device restricts or prevents any portion of laterals 22 from moving upward away from the floor of the corresponding storage or collection device. Hence, laterals 22 are not subject to being damaged by movement which may occur during operation of the system.

Figure 6:
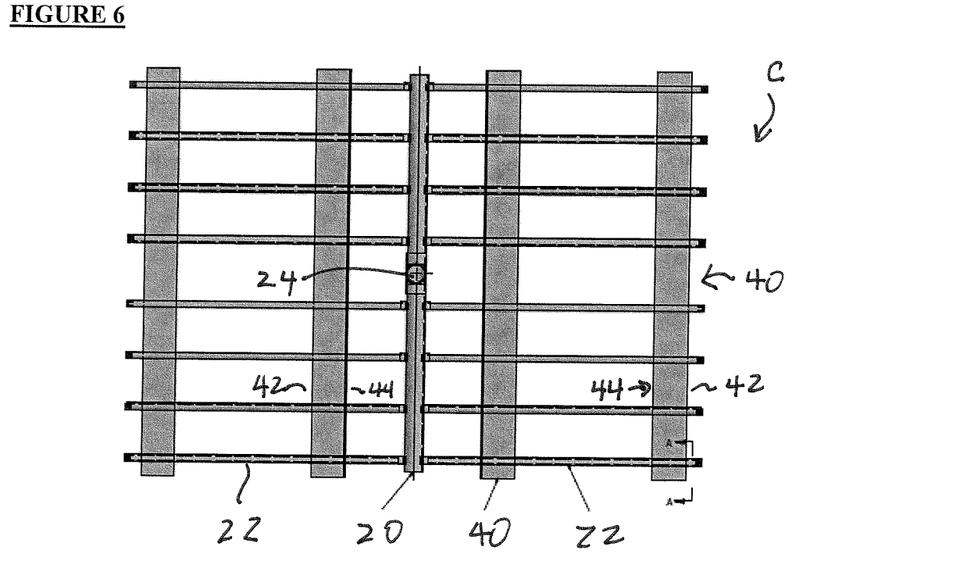
FIG. 6 is a plan view of another preferred form of grid for use as either a sludge removal grid or a fluid distribution grid.
Figure 7:
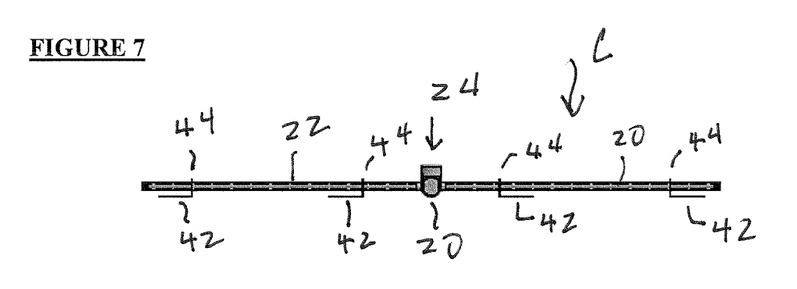
FIG. 7 is a front elevational view of the grid depicted in FIG. 6.
Figure 8:
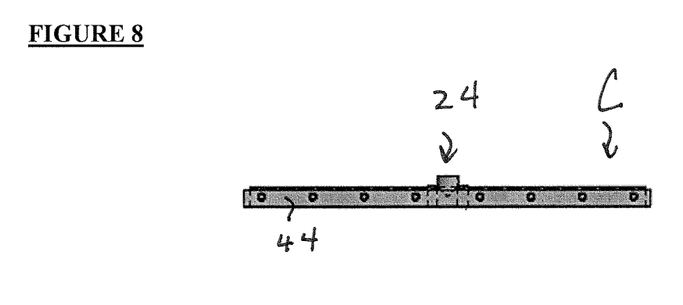
FIG. 8 is a side elevational view of the grid depicted in FIG. 6.
Figure 9:
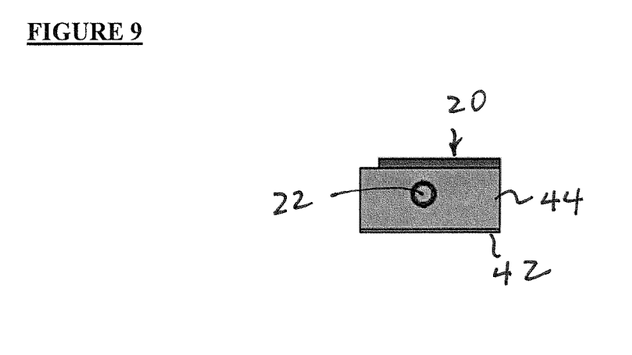
FIG. 9 is an enlarged view of the portion of the grid of FIG. 6 designated by lines A-A in FIG. 6.

Referring to FIGS. 6 to 9, grid C includes header 20, laterals 22 and piping connector 24. Grid C further preferably includes a plurality of movement restricting/prevention members 40. Preferably, movement restricting/prevention members 40 are each connected to a plurality of laterals 22. As seen in FIG. 6, two movement restricting/prevention members 30 are connected to each lateral 22 in each set of eight laterals 22 extending from opposite sides of header 20. It should be noted that the number of laterals in any given set of laterals and the number of movement restricting/prevention members 40 connected to each set of laterals may be readily varied as desired.

Preferably, movement restricting/prevention members 40 each include a horizontally or substantially horizontally extending member 42 and a vertically or substantially vertically extending member 44 attached to member 42 adjacent a lower portion of member 44. While the shape of members 40 are illustrated as being L-shaped (see FIG. 7), the shape of members 40 may be varied as desired. Each member 44 has a plurality of openings for receiving a corresponding lateral. Member 44 is preferably fixed to laterals 22 so that member 40 does not move relative to the corresponding laterals.

Each component of the movement restricting/prevention members 40 can be made of plastic (e.g., PVC) or any other suitable material. Preferably, member 42 is made of a flimsy material (e.g., ⅛ inch plastic). Preferably, as illustrated in FIG. 14, movement restricting/prevention members 40 are configured such that the lowermost surface (e.g., lower surface of member 42) rests on a floor of the corresponding storage or collection device without any portion of the movement restricting/prevention members 40 being fixed, attached or anchored to the floor. Because the lowermost surface of members 40 are in direct contact with the floor of the corresponding storage or collection device, no portion of laterals 22 can move toward the floor. Members 42 have an exposed upper surface area of sufficient size such that the existing fluid pressure acting on the exposed upper surface area in the corresponding storage or collection device restricts or prevents any portion of laterals 22 from moving upward away from the floor of the corresponding storage or collection device. Hence, laterals 22 are not subject to being damaged by movement which may occur during operation of the system.

Figure 10:
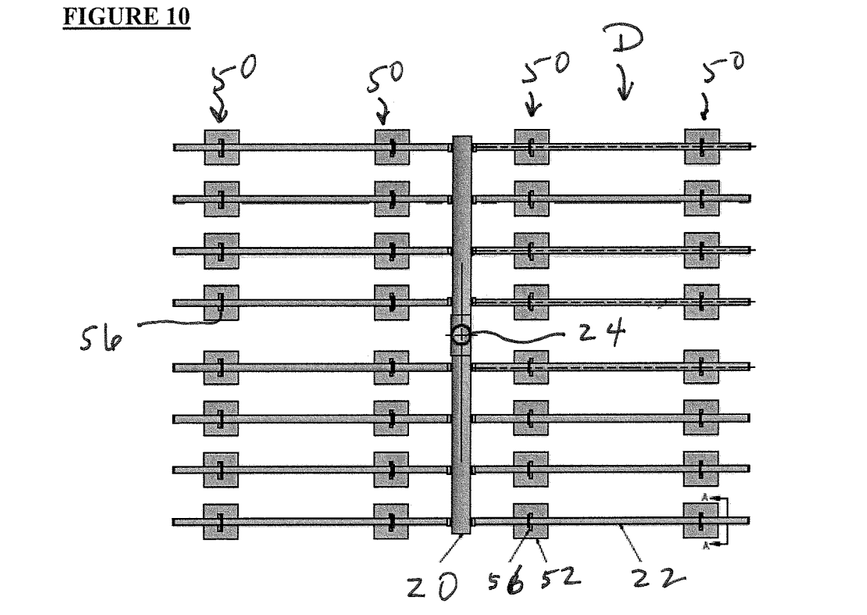
FIG. 10 is a plan view of a further preferred form of grid for use as either a sludge removal grid or a fluid distribution grid.
Figure 11:
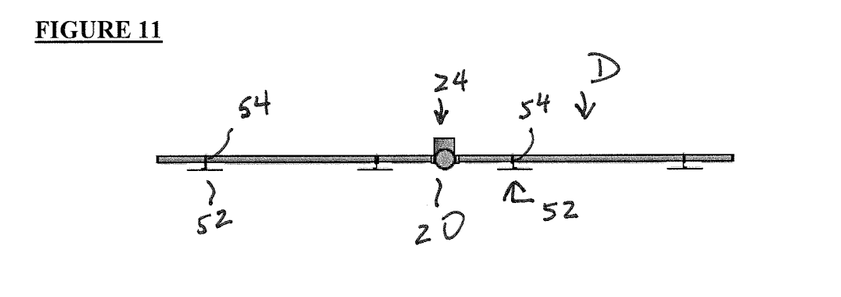
FIG. 11 is a front elevational view of the grid depicted in FIG. 10.
Figure 12:
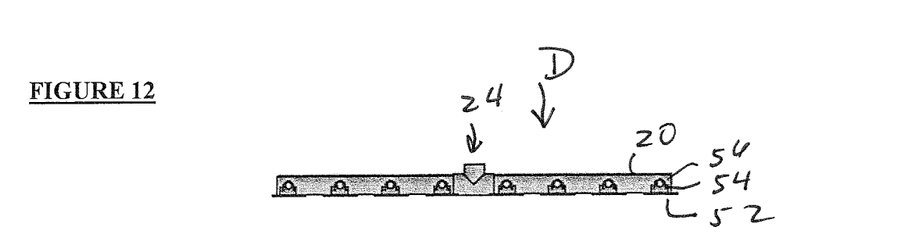
FIG. 12 is a side elevational view of the grid depicted in FIG. 10.

Referring to FIGS. 10 to 13, grid D includes header 20, laterals 22 and piping connector 24. Grid D further preferably includes a plurality of movement restricting/prevention members 50. Preferably, movement restricting/prevention members 50 are each connected to a single lateral 22. As seen in FIG. 10, two movement restricting/prevention members 50 are connected to each lateral 22 in each set of eight laterals 22 extending from opposite sides of header 20. It should be noted that the number of laterals in any given set of laterals and the number of movement restricting/prevention members 50 connected to each set of laterals may be readily varied as desired.

Preferably, movement restricting/prevention members 50 each include a horizontally or substantially horizontally extending member 52 and a vertically or substantially vertically extending member 54 attached to member 52 adjacent a lower portion of member 54. While the shape of members 50 are illustrated as being T-shaped (see FIG. 11), the shape of members 50 may be varied as desired. Preferably, member 52, as illustrated in FIG. 10, extends outwardly the same distance from each side of the corresponding lateral 22.

Figure 13:
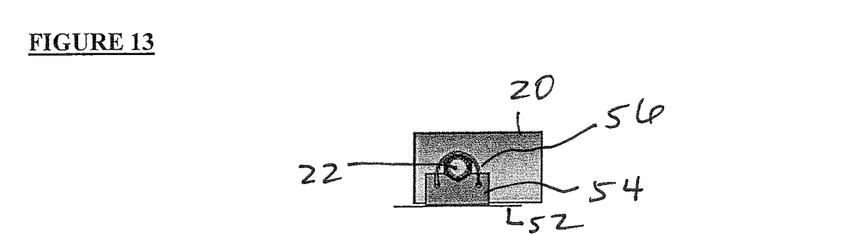
FIG. 13 is an enlarged view of the portion of the grid of FIG. 10 designated by lines A-A in FIG. 10.
Figure 14:
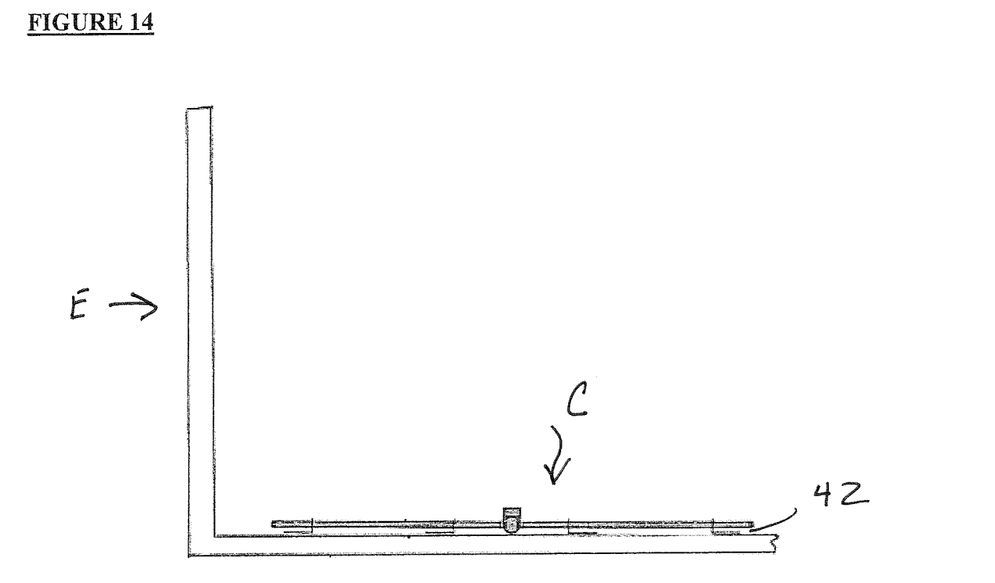
FIG. 14 is a fragmentary elevational view of the grid depicted in FIG. 6 disposed in an operating position in a containment vessel.

Referring to FIG. 13, member 54 includes a recess which conforms to the contour of a lower portion of the outer periphery of the corresponding lateral so that a corresponding portion of the lateral rests in the recess of member 54 and directly contacts member 54. Connectors 56 extend around an upper portion of the outer periphery of laterals 22 and are connected at opposite ends to each of the plurality of members 54 to support members 54 and member 52 on the corresponding lateral. It should be noted that connector 56 is preferably fixed to a portion of the corresponding lateral so that movement restricting/prevention members 50 do not move relative to the laterals.

Each component of the movement restricting/prevention members 50 can be made of plastic (e.g., PVC) or any other suitable material. Preferably, member 52 is made of a flimsy material (e.g., ⅛ inch plastic). Preferably, movement restricting/prevention members 50 are configured such that the lowermost surface (e.g., lower surface of member 52) rests on a floor of the corresponding storage or collection device without any portion of the movement restricting/prevention members 50 being fixed, attached or anchored to the floor. Because the lowermost surface of members 50 are in direct contact with the floor of the corresponding storage or collection device, no portion of laterals 22 can move toward the floor. Members 52 have an exposed upper surface area of sufficient size such that the existing fluid pressure acting on the exposed upper surface area in the corresponding storage or collection device restricts or prevents any portion of laterals 22 from moving upward away from the floor of the corresponding storage or collection device. Hence, laterals 22 are not subject to being damaged by movement which may occur during operation of the system.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A sludge collection system for removing sludge, said sludge collection system comprising:
 (a) at least one sludge removal zone for removing sludge, said at least one sludge removal zone includes a sludge collection container and a fixed sludge removal grid disposed in said sludge collection container, said fixed sludge removal grid including a header and a plurality of floating collection laterals connected to said header such that during removal of sludge from said sludge collection container, sludge passes from said plurality of floating collection laterals to said header; and,
 (b) at least one movement restricting member being connected to said plurality of floating collection laterals for restricting movement of said plurality of floating collection laterals away from and towards a floor of the sludge collection container, said at least one movement restricting member being spaced from said header and an upper portion of said at least one movement restricting member extending around an upper portion of an outer periphery of a corresponding floating collection lateral; and, (c) said at least one movement restricting member includes a first movement restricting member mounted on each of said plurality of floating collection laterals and wherein said first movement restricting member is one of the following: (i) L-shaped; and, (ii) T-shaped.

2. The sludge collection system as set forth in claim 1, wherein:
(a) said first movement restricting member includes a first vertically extending segment mounted on each of said plurality of floating collection laterals.

3. The sludge collection system as set forth in claim 2, wherein:
(a) said first vertically extending segment of said first movement restricting member includes a plurality of openings each of which is configured to receive a corresponding one of said plurality of floating collection laterals.

4. The sludge collection system as set forth in claim 1, wherein:
(a) said first movement restricting member is L-shaped.

5. The sludge collection system as set forth in claim 1, wherein:
(a) said first movement restricting member is T-shaped.

6. The sludge collection system as set forth in claim 2, wherein:
(a) said first movement restricting member further includes a first horizontally extending member connected to the first vertically extending member, said first horizontally extending member has a plurality of portions, each of said plurality of portions being positioned directly below a corresponding portion of one of the plurality of floating collection laterals.

7. A sludge collection system for removing sludge, said sludge collection system comprising:
(a) a sludge collection container and at least one sludge removal grid disposed in said sludge collection container for removing sludge from at least a portion of said sludge collection container, said at least one sludge removal grid includes a header and a plurality of collection laterals connected to said header such that during sludge removal, sludge passes from said plurality of collection laterals to said header; and,
(b) at least one movement prevention member connected to said plurality of collection laterals for preventing movement of said plurality of collection laterals towards or away from a floor of said sludge collection container, wherein a lowermost portion of said at least one movement prevention member rests on but does not penetrate the floor of said sludge collection container to prevent a corresponding collection lateral from moving toward the floor of said sludge collection container and an upper portion of said at least one movement prevention member extending around an upper portion of an outer periphery of a corresponding collection lateral, said at least one movement prevention member having an exposed surface area of sufficient size such that fluid pressure acting on the exposed surface area imparts a force on said upper portion of said at least one movement prevention member preventing a corresponding collection lateral from moving upwardly away from the floor of said sludge collection container wherein said exposed surface area is disposed below the corresponding collection lateral such that a space is formed between the exposed surface area and the corresponding collection lateral.

8. The sludge collection system as set forth in claim 7, wherein:
(a) said at least one movement prevention member includes a first movement prevention member mounted on each of said plurality of collection laterals and a second movement prevention member mounted on each of said plurality of collection laterals.

9. The sludge collection system as set forth in claim 8, wherein:
(a) said first movement prevention member and said second movement prevention member each include a first vertically extending segment mounted on each of said plurality of collection laterals.

10. The sludge collection system as set forth in claim 9, wherein:
(a) said first vertically extending segment of each of said first movement prevention member and said second movement prevention member includes a plurality of openings for receiving a corresponding one of said plurality of collection laterals.

11. The sludge collection system as set forth in claim 7, wherein:
(a) said at least one movement prevention member includes a plurality of movement prevention members wherein each movement prevention member of said plurality of movement prevention members is mounted on only one of said plurality of collection laterals.

12. The sludge collection system as set forth in claim 11, wherein:
(a) each of said plurality of movement prevention members includes a horizontally extending segment having a lowermost surface which rests on the floor of said sludge collection container.

13. The sludge collection system as set forth in claim 12, wherein:
(a) said plurality of movement prevention members includes first, second, third and fourth movement prevention members, said first and second movement prevention members are connected to one of said plurality of collection laterals and said third and fourth movement prevention members are connected to another of said plurality of collection laterals.

\* \* \* \* \*